(No Model.)
R. B. HOUGH.
COOKING UTENSIL HOLDER.
No. 367,633. Patented Aug. 2, 1887.
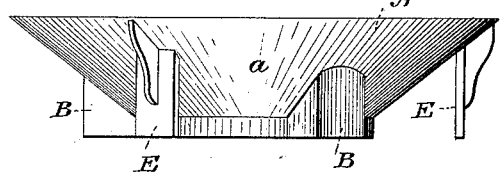
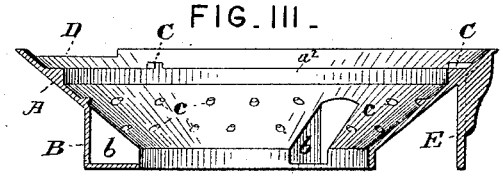
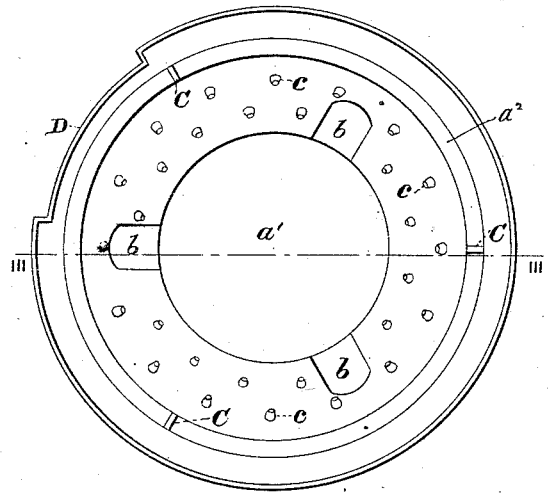
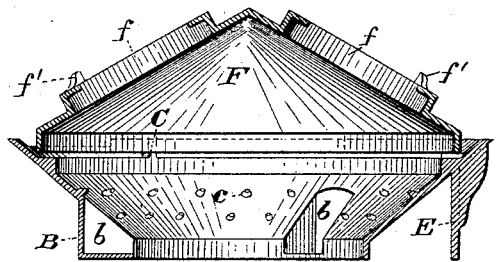
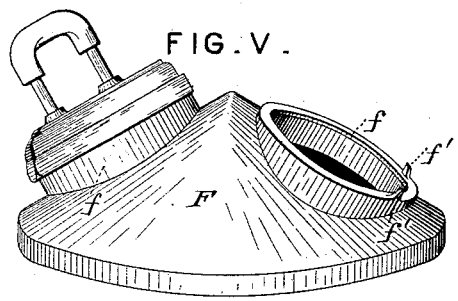
Attest:
Geo. T. Smallwood,
Rex. Smith.
Inventor:
Robert B. Hough,
By A. M. Smith
Atty.
N. PETERS, Photo-Lithographer, Washington, D. C.

UNITED STATES PATENT OFFICE.

ROBERT B. HOUGH, OF ERIE, PENNSYLVANIA, ASSIGNOR TO MATTHEW GRISWOLD, OF SAME PLACE.

COOKING-UTENSIL HOLDER.

SPECIFICATION forming part of Letters Patent No. 367,633, dated August 2, 1887.

Application filed February 10, 1887. Serial No. 227,153. (No model.)

*To all whom it may concern:*

Be it known that I, ROBERT B. HOUGH, of Erie, county of Erie, and State of Pennsylvania, have invented a new and useful Improvement in Cooking-Utensil Holders, of which the following is a full, clear, and exact description, reference being had to the accompanying drawings, making part of this specification.

This invention relates to attachments for supporting utensils upon gasoline or other stoves while said utensils and their contents are being heated; and the object of the invention is to produce an attachment which will accommodate utensils of different sizes and properly deflect the heat or flame around the base of the utensil.

To the above purpose my invention consists in the peculiar and novel form of the attachment and its seats, and recesses for the bottom of the utensil, as hereinafter described and claimed.

In order that my invention may be fully understood, I will proceed to describe it with reference to the accompanying drawings, in which—

Figure I is a side elevation of my improved attachment. Fig. II is a plan view of the same. Fig. III is a transverse vertical section of the same on the line 3 3 of Fig. II. Fig. IV is a sectional view similar to Fig. III, showing the flat-iron holder in position upon the attachment. Fig. V is a perspective view of the holder detached from the support.

In the said drawings, A designates the body of the attachment or deflector, said body being circular in form and having oblique sides $a$, which converge inwardly toward the base of the device. An aperture, $a'$, is formed in the center of the base of the device, and serves to admit the heat and flame from the burner. Upon the outer side of the device are formed integrally a number of hollow lugs, B, the cavities $b$ of which serve as recesses to receive the legs of a kettle or other utensil when in position upon the attachment.

$c$ designates a number of small lugs, which are formed integrally on the inner surface of the sides of the device, and which are so arranged therein as to support the bottoms of utensils of various sizes. The rim of the device is formed with a recess, D, the purpose of which is to receive the handle of a frying-pan, waffle-iron, or other similar utensil placed upon the attachment.

E designates legs, which are formed integrally upon the rim of the device and extend downwardly therefrom, the purpose of said legs being to support the attachment above the burner. The legs E may, however, be dispensed with, although it is preferable to employ them, without departing from the spirit of my invention.

An annular flange, $a^2$, is formed upon the inner part of the device near its top or rim to receive the largest size of utensils to be supported by the attachment.

From the above description it will be seen that when a utensil is set into the attachment the oblique sides $a$ thereof will properly deflect the heat and flame from the burner around the bottom and sides of the utensil, and thus thoroughly utilize and economize the heat.

In Figs. IV and V, I have shown a support, F, for flat-irons, which is designed to be used in connection with the attachment above described. This support is of conical form, and its sides are provided with openings, through which the heat or flame passes into contact with the flat-iron. In order to retain the flat-irons upon these openings, lugs $f'$ are formed upon the holder adjacent to the lower margins of said openings, and the backs or sides of the irons are placed against said lugs, so as to retain the irons in proper position upon the holder. The lower edge of the holder is to be placed upon the annular shoulder $a^2$ of the deflector, so as to be properly sustained thereon.

Having thus described my invention, what I claim as new, and desire to secure by Letters Patent, is—

1. An improved attachment for holding utensils upon vapor-stoves, &c., consisting of a body portion having downwardly-convergent sides recessed to receive the legs of the utensils, and suitable seats on its inner sides for varying sizes of utensils, substantially as described.

2. An improved holder for utensils, consisting of a body, A, having the downwardly-convergent sides $a$, provided with the annular seat $a^2$ and lugs $c$, and having the recesses $b$ and D, and the central opening, $a'$, all substantially as and for the purpose described.

In testimony whereof I have hereunto set my hand this 8th day of February, A. D. 1887.

ROBERT B. HOUGH.

Witnesses:
WM. P. HAYES.
W. P. COWELL.